US009796902B2

(12) United States Patent
Osorio et al.

(10) Patent No.: US 9,796,902 B2
(45) Date of Patent: Oct. 24, 2017

(54) SEALANT COMPOSITIONS FOR USE IN SUBTERRANEAN FORMATION OPERATIONS

(71) Applicant: Halliburton Energy Services, Inc., Houston, TX (US)

(72) Inventors: Jose del Carmen Jimenez Osorio, Carmen (MX); Omar Davila Escamilla, Carmen (MX); Jonnathan Ricardo Tellez Abaunza, Carmen (MX); Carmen Josefina Ramirez, Ciudad del Carmen (MX)

(73) Assignee: Halliburton Energy Services, Inc., Houston, TX (US)

( * ) Notice: Subject to any disclaimer, the term of this patent is extended or adjusted under 35 U.S.C. 154(b) by 207 days.

(21) Appl. No.: 14/526,957

(22) Filed: Oct. 29, 2014

(65) Prior Publication Data

US 2015/0114649 A1   Apr. 30, 2015

Related U.S. Application Data

(60) Provisional application No. 61/897,605, filed on Oct. 30, 2013.

(51) Int. Cl.
  *C09K 8/44* (2006.01)
  *C09K 8/512* (2006.01)
(52) U.S. Cl.
  CPC ............. *C09K 8/44* (2013.01); *C09K 8/512* (2013.01)
(58) Field of Classification Search
  None
  See application file for complete search history.

(56) References Cited

U.S. PATENT DOCUMENTS

| 5,203,834 A | 4/1993 | Hutchins et al. |
| 5,513,705 A | 5/1996 | Djabbarah et al. |
| 5,588,488 A | 12/1996 | Vijn et al. |
| 5,688,844 A * | 11/1997 | Chatterji ............ C04B 28/04 166/293 |

(Continued)

FOREIGN PATENT DOCUMENTS

| EP | 0875658 A2 | 11/1998 |
| WO | 2004025075 A1 | 3/2004 |
| WO | 2012013929 A1 | 2/2012 |

*Primary Examiner* — Angela M DiTrani
(74) *Attorney, Agent, or Firm* — McDermott Will & Emery LLP

(57) ABSTRACT

Methods comprising providing a sealant composition comprising an aqueous base fluid and a crosslinkable polymer composition, wherein the crosslinkable polymer composition comprises a crosslinkable organic polymer and a crosslinker; introducing an elastic gellable composition into the sealant composition, wherein the elastic gellable composition is an aqueous emulsion comprising an aqueous continuous phase and a dispersed phase comprising elastomeric polymers; introducing the sealant composition into a subterranean formation; and crosslinking the sealant composition into a gel to form a seal in the subterranean formation, thereby forming an elastic gelled sealant composition, wherein the elastic gellable composition reduces the brittleness of the elastic gelled sealant composition as compared to the sealant composition without the elastic gellable composition.

19 Claims, 1 Drawing Sheet

(56) References Cited

U.S. PATENT DOCUMENTS

| | | | |
|---|---|---|---|
| 5,836,392 A | 11/1998 | Urlwin-Smith | |
| 6,176,315 B1 | 1/2001 | Reddy et al. | |
| 6,184,287 B1 | 2/2001 | Westerman | |
| 6,192,986 B1 | 2/2001 | Urlwin-Smith | |
| 6,196,317 B1 | 3/2001 | Hardy | |
| 6,268,314 B1 | 7/2001 | Hughes et al. | |
| 6,488,764 B2 | 12/2002 | Westerman | |
| 7,022,755 B1 | 4/2006 | Chatterji et al. | |
| 7,287,587 B2 | 10/2007 | Reddy et al. | |
| 8,343,896 B2 | 1/2013 | Eoff et al. | |
| 8,522,874 B2 | 9/2013 | Reddy et al. | |
| 2006/0162930 A1* | 7/2006 | Gronsveld | C04B 28/02 166/293 |
| 2006/0234871 A1* | 10/2006 | Dalrymple | C09K 8/428 507/211 |
| 2007/0111900 A1* | 5/2007 | Reddy | C09K 8/24 507/221 |
| 2010/0036017 A1 | 2/2010 | Eoff et al. | |
| 2012/0090841 A1 | 4/2012 | Reddy et al. | |
| 2013/0000911 A1 | 1/2013 | Reddy et al. | |

* cited by examiner

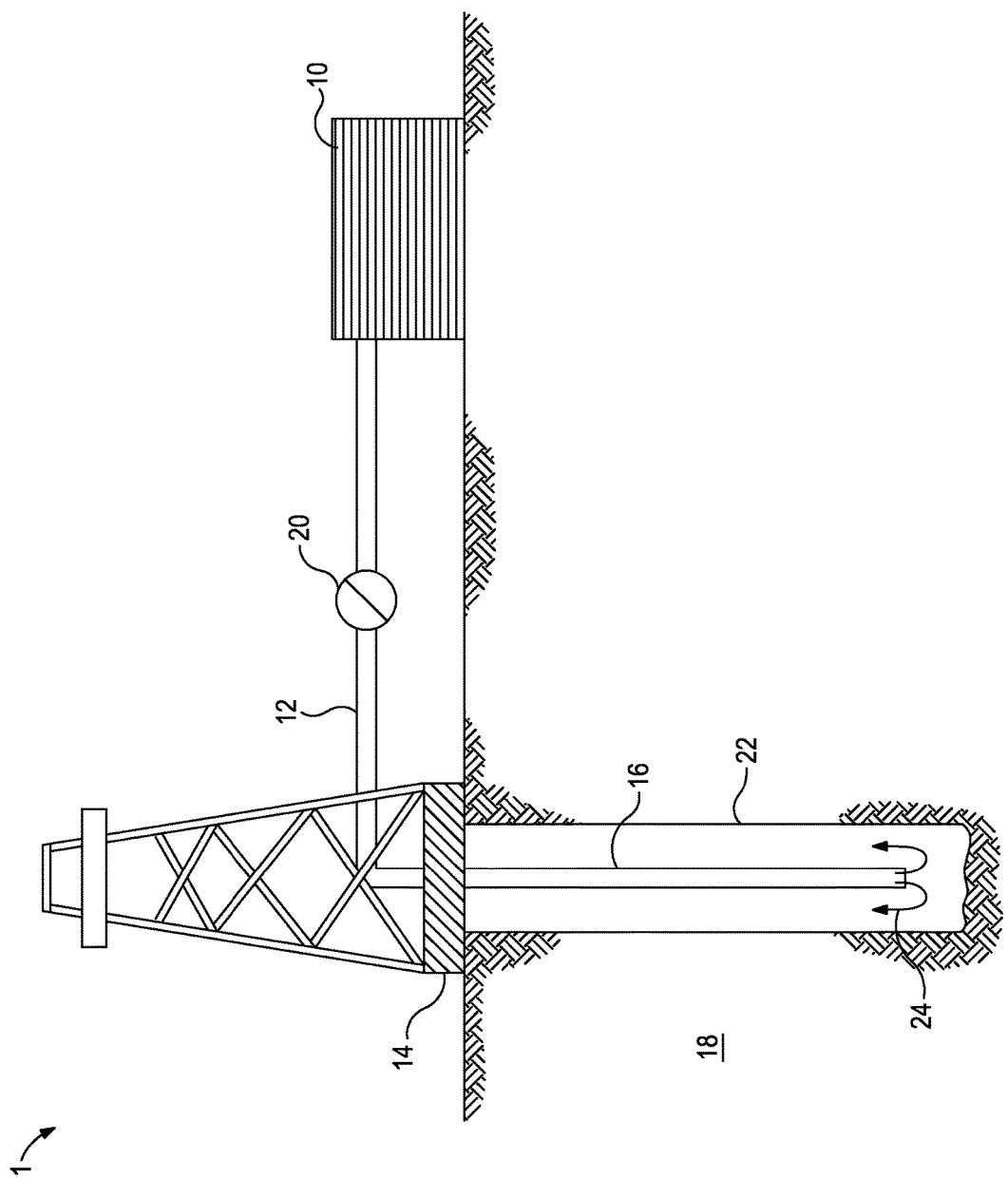

SEALANT COMPOSITIONS FOR USE IN SUBTERRANEAN FORMATION OPERATIONS

BACKGROUND

The embodiments herein relate to sealant compositions for use in subterranean formation operations, and, more particularly to elastic gelled sealant compositions.

A natural resource, such as oil, residing in a subterranean formation may be recovered by drilling a well into the subterranean formation. The well may be isolated from the surrounding subterranean formation using an operation known as cementing. In a cementing operation, a cement sheath around a casing (or liner string) may be placed within the well. The cement sheath is formed by pumping a cement slurry through the bottom of the casing and out through the annulus between the outer casing wall and the formation face of the wellbore. The cement slurry then cures in the annular space, thereby forming a sheath of hardened cement that, inter alia, supports and positions the casing in the wellbore and bonds the exterior surface of the casing to the subterranean formation.

The subterranean formation may thereafter be stimulated for the production of oil through the cemented wellbore. In some operations, the subterranean formation may be stimulated by a hydraulic fracturing treatment. In hydraulic fracturing treatments, a treatment fluid is pumped past the cement sheath and into a portion of the subterranean formation at a rate and pressure such that the subterranean formation breaks down, and one or more fractures are formed. Typically, particulate solids, such as graded sand, are suspended in a portion of the treatment fluid and then deposited into the fractures. These particulate solids, or "proppant particulates," serve to prop open the fracture (e.g., keep the fracture from fully closing) after the hydraulic pressure is removed. By keeping the fracture from fully closing, the proppant particulates aid in forming conductive paths through which produced fluids, such as oil, may flow.

During oil production from a subterranean formation, water or undesirable gas may seep from the formation and accompany the produced oil. The production of water or unwanted gas with the produced oil may present major problems, including a significant reduction of oil production, the need for costly remedial actions, downtime in production, and the like. The water may seep into the well with produced oil from any subterranean zone in communication with the oil producing formation, such as, for example, through a fracture, a high-permeability streak, a high-permeability zone, and the like, or may be the result of water coning, water cresting, lateral channeling, and the like. Additionally, the source of the water may be from waterflood techniques. Likewise, although in some instances gas may be desirably produced from a subterranean formation, certain gases may be undesirable and production at high gas/oil ratios may decrease the productive life of the subterranean formation. Unwanted gas may seep into the well with produced oil due to a variety of causes, including fractures in the formation, gas coning, gas channeling, and the like as a result of the high mobility of gas in the formation.

Conformance control treatments may be used to reduce the influx of water ("water shutoff") or gas ("gas shutoff") with produced oil. As used herein, the term "conformance control" and any variants thereof (e.g., "conformance treatments" or "conformance control treatments") refers to sealant treatments involving the placement of a material, or a "conformance material" or "conformance composition," into a wellbore and into a water-bearing or gas-bearing portion of a subterranean formation that is capable of at least partially preventing, reducing, or otherwise controlling the influx of the water or gas into the wellbore. Such conformance materials may include, but are not limited to, particulates, gels, sealants, blocking polymers, and the like. Conformance control treatments may enhance recovery efficiency and reduce costly downtime or separation techniques required for separating the oil from unwanted produced fluids.

Subterranean formations often require conformance treatments at depleted or low pressure zones, where the hydrostatic pressure coupled with pumping pressure in the wellbore may exceed the fracture gradient of the formation, thus promoting the formation of unplanned, induced fractures and significant loss of drilling or other treatment fluids, particularly those having high densities. Conformance materials may additionally be lost into these fractures or other areas of high permeability if they are themselves high-density fluids or are delivered in high-density fluids. Foamed conformance materials have thus been used due to their low-density properties. Conformance materials must also often remain stable at extreme temperatures and pH values. In some cases, conformance materials ideally are able to withstand shrinkage, cracking, or the formation of other formation material losses as a result of, for example, shifting or other movement in the wellbore. Such losses may cause a breach in the conformance material, thereby partially or wholly breaching the barrier between the wellbore and the water-bearing or gas-bearing portion of the subterranean formation.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the elastic gelled sealant compositions of the embodiments described herein to a downhole location.

DETAILED DESCRIPTION

The embodiments herein relate to sealant compositions for use in subterranean formation operations and, more particularly to elastic gelled sealant compositions. The elastic gelled sealant compositions may exhibit increased elongation at break profiles and a tacky characteristic, due to the presence of an elastic gellable composition. The elastic gelled compositions may be employed to prevent or reduce the flow of water and/or gas through a subterranean formation with produced oil.

Although some embodiments described herein are illustrated by reference to conformance treatments, the sealant compositions comprising the elastic gellable compositions disclosed herein may be used in any subterranean formation operation that may benefit from an elastic gelled sealant composition. Such treatment operations may include, but are not limited to, an enhanced recovery operation; a steam assisted gravity drainage operation; a leakoff control operation; a drilling operation; a stimulation operation; an acidizing operation; an acid-fracturing operation; a sand control operation; a completion operation; a scale inhibiting operation; a water-blocking operation; a clay stabilizer operation; a fracturing operation; a frac-packing operation; a gravel packing operation; a wellbore strengthening operation; a sag control operation; a well control operation; and any combination thereof.

Moreover, the sealant compositions comprising the elastic gellable compositions described herein may be used in any non-subterranean operation that may benefit from their elastic sealing properties. Such operations may be performed in any industry including, but not limited to, oil and gas, mining, chemical, pulp and paper, aerospace, medical, automotive, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, the present disclosure provides a sealant composition comprising an aqueous base fluid, a crosslinkable polymer composition, and an elastic gellable composition. The crosslinkable polymer composition may comprise a crosslinkable organic polymer and a crosslinker. The elastic gellable composition may be an aqueous emulsion comprising an aqueous continuous phase and a dispersed phase comprising elastomeric polymers. The sealant composition is gelled by reacting at least the crosslinkable organic polymer with the crosslinker, such as by covalent or ionic bonding, thereby forming an elastic gelled sealant composition. As used herein, the term "elastic gelled sealant composition" refers to a crosslinked gelled composition having at least some ability to deform elastically when stress is applied and return to its original shape when the applied stress is removed. After crosslinking into the gel, the presence of the elastic gellable composition in the gelled sealant composition increases the elongation at break of the sealant composition as compared to the sealant composition without the elastic gellable composition, thus allowing the formation of the elastic gellable sealant composition. That is, the presence of the elastic gellable composition at least partially provides the elastic deformation characteristic to the elastic gelled sealant composition. As used herein, the term "elongation at break," and grammatical variants thereof, refers to the total elongation or amount of uni-axial strain at rupture or fracture, including both elastic and plastic deformation. Elongation may be in any direction in space (e.g., area, volume, height, width, length, depth, and the like).

In some embodiments, the present disclosure provides a method of sealing a portion of a subterranean formation using the elastic gelled sealant composition. As used herein, the term "seal," and grammatical variants thereof (e.g., "sealing" and "sealed"), refers to at least a partial blockage of a fluid zone to prevent or reduce fluid loss into and/or from that zone. The sealant composition comprising the aqueous base fluid, crosslinkable polymer composition, and elastic gellable composition may be introduced into a subterranean formation and allowed to crosslink into a gel therein, thereby forming an elastic gelled sealant composition. The elastic gelled sealant composition may form a seal in at least a portion of the subterranean formation to prevent or reduce the flow of fluids into or from the formation at one or more particular locations. In some embodiments, an emulsion surfactant may be added into the sealant composition to aid in preventing or reducing the tendency of the elastic gellable composition to come out of the aqueous emulsion.

The order in which the crosslinkable polymer composition, the elastic gellable composition, and/or the emulsion surfactant is included in the sealant composition is not material to the embodiments described herein. In some embodiments, the crosslinkable polymer composition may be included before or after, or at the same time as, the elastic gellable composition. In some embodiments, the crosslinkable polymer composition and the emulsion surfactant may be included before or after, or at the same time as, the elastic gellable composition. In yet other embodiments, the elastic gellable composition and the emulsion surfactant may be included before or after, or at the same time as, the crosslinkable polymer composition. Moreover, the individual components of the crosslinkable polymer composition may be included in any order, together or separately. For example, in some embodiments, the elastic gellable composition and the crosslinkable organic polymer of the crosslinkable polymer composition may be included with the aqueous base fluid prior to including the crosslinker of the crosslinkable polymer composition, such as to delay crosslinking into a gel. Other ordering may also be suitable, without departing from the scope of the present disclosure.

Generally, the elastic gellable composition is included in the sealant composition prior to allowing any or a substantial amount of crosslinking to occur, such as by controlling temperature. As used herein, the term "substantial," and grammatical variants thereof (e.g., "substantially"), mean largely but not necessarily wholly. In some embodiments, the crosslinker may be designed such that it does not crosslink the sealant composition until reaching a particular temperature in a subterranean formation. In other embodiments, the crosslinker may crosslink the sealant composition immediately or close to immediately after each of the aqueous base fluid, crosslinkable polymer composition, and elastic gellable composition is present in their entirety.

In some embodiments, the elastic gellable composition may increase the elongation at break of the sealant composition as compared to the sealant composition without the elastic gellable composition, thereby forming an elastic gelled sealant composition. In some embodiments, the elastic gellable composition may increase the percent elongation at break of the sealant composition to form an elastic gelled sealant composition as compared to the sealant composition without the elastic gellable composition in the range of a lower limit of about 20%, 25%, 30%, 35%, 40%, 45%, 50%, 55%, 60%, 65%, 70%, 75%, 80%, and 85% to an upper limit of about 150%, 145%, 140%, 135%, 130%, 125%, 120%, 115%, 110%, 100%, 95%, 90%, and 85%, encompassing any value and subset therebetween.

In addition to increasing the elongation at break of the sealant compositions by including the elastic gellable composition and/or the elastic gellable composition and the emulsion surfactant, the elastic gellable composition may also beneficially exhibit a tacky and thixotropic quality. As used herein, the term "tacky" in all of its forms, refers to a substance having a nature such that it is somewhat sticky to the touch. The tacky nature of the elastic gellable composition may aid in adhering the sealant composition to the subterranean formation to form a seal before being crosslinked into the elastic gelled sealant composition, or aid in adhering the elastic gelled sealant composition (i.e., after crosslinking) to the subterranean formation to form a gel.

Moreover, the tacky nature may allow the elastic gelled sealant composition forming the seal to better react to the stresses or movements within the subterranean formation. That is, the tacky nature of the elastic gelled sealant composition may synergistically operate with the elastic nature (i.e., the increased elongation at break) of the composition, such that it does not generally become detached from the subterranean formation, for example, when experiencing movement, thereby permitting the elastic gelled sealant composition to better move with the formation itself. In addition, the tacky nature may reduce the possibility of gas fingering while the sealant composition is crosslinking to form the elastic gelled sealant composition.

For the purposes of describing the components of the sealant compositions forming the elastic gellable compositions upon crosslinking into a gel, the term "sealant composition" may be used to encompass both. That is, when a component is described as forming a portion of the "sealant composition," the term encompasses both the sealant composition before crosslinking and after crosslinking into the elastic gelled sealant composition.

The aqueous base fluid for use in the sealant compositions and the aqueous continuous phase of the aqueous emulsion forming the elastic gellable compositions, as described herein, may be any aqueous base fluid suitable for use in a subterranean formation, provided that it does not adversely interfere with the sealant compositions or the formation of the elastic gelled sealant compositions. Suitable aqueous based fluids may include, but are not limited to, fresh water; saltwater (e.g., water containing one or more salts dissolved therein); brine (e.g., saturated salt water); seawater; formation water; produced water; and any combination thereof. Generally, the aqueous base fluid may be from any source, provided that it does not contain components that may adversely interfere with the sealant compositions or the elastic gelled sealant compositions described herein. Brines for use as the aqueous base fluid may be formulated or manufactured by dissolving one or more soluble salts in fresh water, a natural brine, or seawater. Representative soluble salts may include, but are not limited to, chloride; bromide; acetate; a formate salt of potassium; a formate salt of sodium; a formate salt of calcium; a formate salt of magnesium; a formate salt of zinc; and any combination thereof. In some embodiments, the aqueous base fluid may be present in the sealant compositions described herein in an amount in the range of from a lower limit of about 65%, 67.3%, 69.6%, 71.9%, 74.2%, 76.5%, 78.8%, and 81.1% to an upper limit of about 99.5%, 97.2%, 94.9%, 92.6%, 90.3%, 88%, 85.7%, 83.4%, and 81.1% by volume of the sealant composition, encompassing any value and subset therebetween.

The crosslinkable polymer composition for use in the sealant compositions described herein may comprise a crosslinkable organic polymer and a crosslinker. In some embodiments, the crosslinkable organic polymer and the crosslinker are water-soluble. The crosslinkable organic polymer may be any organic polymer capable of being crosslinked with a crosslinker to gel the sealant compositions described herein. In some embodiments, the crosslinkable organic polymers may include, but are not limited to, an acrylamide-based polymer; an acrylamide-based copolymer; and any combination thereof. As used herein, the term "copolymer" refers to a polymer containing two or more types of monomer units (e.g., including terpolymers, tetrapolymers, pentapolymers, and the like). Copolymers may include random copolymers, block copolymers, graft copolymers, and the like.

Suitable examples of crosslinkable organic polymers for use in the sealant compositions described herein many include, but are not limited to, a polyacrylamide; an acrylamide copolymer; an acrylamide-co-t-butylacrylate copolymer; a 2-acrylamido-2-methylpropane sulfonic acid/acrylamide copolymer; a sulfonated styrene/maleic anhydride copolymer; a vinylpyrrolidone/2-acrylamido-2-methylpropane sulfonic acid/acrylamide terpolymer; a 2-acrylamido-2-methylpropane sulfonic acid/N—N-dimethylacrylamide/acrylamide terpolymer; a polyketone; an acrylamide/t-butyl acrylate copolymer; any derivative thereof; and any combination thereof.

In general, the greater number of monomers in the crosslinkable organic polymer that are minimally reactive, the greater the temperature at which gelation may occur and the greater the time lapse before gelation begins. Thus, a crosslinkable organic polymer having a large number of minimally reactive monomers may be used in high temperature formations and may enable increased pumping time such as, for example, in treating particularly deep or long subterranean formation wells.

In some embodiments, the crosslinkable organic polymer may be present in the sealant compositions described herein in an amount in the range of from a lower limit of about 0.1%, 0.5%, 1%, 1.5%, 2%, 2.5%, 3%, 3.5%, 4%, 4.5%, 5%, 5.5%, 6%, 6.5%, 7%, 7.5%, 8%, 9%, 9.5%, and 10% to an upper limit of about 20%, 19.5%, 19%, 18.5%, 18%, 17.5%, 17%, 16.5%, 16%, 15.5%, 15%, 14.5%, 14%, 13.5%, 13%, 12.5%, 12%, 11.5%, 11%, 10.5%, and 10% by volume of the sealant composition, encompassing any value and subset therebetween. In other embodiments, the crosslinkable organic polymer may be present in the sealant composition described herein in an amount in the range of from about 0.5% to about 12% by volume of the sealant composition.

The crosslinker for use in the crosslinkable polymer compositions described herein may be any crosslinker capable of undergoing a crosslinking reaction with the crosslinkable organic polymer. Under certain conditions (e.g., temperature, time, and the like), the crosslinker may react with one or more suitable crosslinkable organic polymers included in the crosslinkable polymer composition so as to form a gel. In some embodiments, the crosslinkers may include, but are not limited to, an amine-containing polymer; an amine-containing copolymer; and any combination thereof. Suitable examples of crosslinkers for use in the embodiments described herein may include, but are not limited to, a polyalkyleneimine (e.g., polyethyleneimine); a polyalkylenepolyamine; a polyfunctional aliphatic amine; an arylalkylamine; a heteroarylalkylamine; a chitosan; a polylysine; a vinyl alcohol/vinylamine copolymer; a partially hydrolyzed polyvinyl formamide; any derivative thereof; and any combination thereof. As used herein, the term "derivative" refers to any compound that is made from one of the listed compounds by replacing one atom in one of the listed compounds with another atom or group of atoms, ionizing one of the listed compounds, or creating a salt of one of the listed compounds.

In some embodiments, the crosslinker may be present in the crosslinkable polymer compositions described herein in an amount in the range of from a lower limit of about 0.05%, 0.1%, 0.5%, 1%, 1.5%, 2%, 2.5%, 3%, 3.5%, 4%, 4.5%, 5%, 5.5%, 6%, 6.5%, 7%, 7.5%, to an upper limit of about 15%, 14.5%, 14%, 13.5%, 13%, 12.5%, 12%, 11.5%, 11%, 10.5%, 10%, 9.5%, 9%, 8.5%, 8%, and 7.5% by volume of the crosslinkable polymer composition, encompassing any value and subset therebetween. In other embodiments, the crosslinker may be present in the crosslinkable polymer compositions described herein in an amount in the range of from about 0.5% to about 5% by volume of the crosslinkable polymer composition.

To modify the time lapse before the sealant composition is crosslinked into a gel ("gelation") to form the elastic gelled sealant composition, or other properties to control gelation (e.g., gelation temperature), the weight ratio of the crosslinkable organic polymer to the crosslinker in the crosslinkable polymer composition may be varied. Varying the weight ratio of the crosslinkable organic polymer to the crosslinkable polymer composition may also aid in controlling the final degree of gelation. In some embodiments, the weight ratio of the crosslinkable organic polymer to the crosslinker may be in the range of from a lower limit of about 1.1:1, 2:1, 10:1, 20:1, 40:1, 60:1, 80:1, 100:1, 120:1, 140:1, 160:1, 180:1, and 200:1 to an upper limit of about 400:1, 380:1, 360:1, 340:1, 320:1, 300:1, 280:1, 260:1, 240:1, 220:1, and 200:1, encompassing any value and subset therebetween. In other embodiments, the weight ratio of the crosslinkable organic polymer to the crosslinker may be in the range of from about 50:1 to about 1.1:1.

In some embodiments, the sealant compositions (e.g., the crosslinkable polymer compositions) described herein may further comprise a gelation retarder. The gelation retarder may act, among other things, to retard the crosslinking reaction between the crosslinkable organic polymer and the crosslinker. That is, the gelation retarder may be included in the sealant compositions to reduce the time lapse before gelation begins between the crosslinkable organic polymer and the crosslinker of the crosslinkable polymer composition. Retarding the crosslinking reaction may be desirable in some applications to, for example, permit increased pumping time to place the sealant compositions at a desired location in a subterranean formation. In some embodiments, the crosslinking reaction may occur to form a gel and form the elastic gelled sealant composition to seal the subterranean formation in a time period ranging from a lower limit of about 2 hours, 6.7 hours, 11.4 hours, 16.1 hours, 20.8 hours, 25.5 hours, 30.2 hours, 34.9 hours, 39.6 hours, 44.3 hours, and 49 hours to an upper limit of about 96 hours, 91.3 hours, 86.6 hours, 81.9 hours, 77.2 hours, 72.5 hours, 67.8 hours, 63.1 hours, 58.4 hours, 53.7 hours, and 49 hours, encompassing any value and subset therebetween.

Additionally, the gelation retarder may permit the crosslinkable polymer compositions to be used at higher temperatures than without the inclusion of the gelation retarder. Such may be desirable when working with a particularly high temperature subterranean formation, for example. In some embodiments, the crosslinkable polymer compositions may undergo the crosslinking reaction at temperatures in the range of from a lower limit of about 121° C. (250° F.), 124° C. (255° F.), 127° C. (260° F.), 129° C. (265° F.), 132° C. (270° F.), 135° C. (275° F.), 138° C. (280° F.), 141° C. (285° F.), 143° C. (290° F.), 146° C. (295° F.), and 149° C. (300° F.) to an upper limit of about 177° C. (350° F.), 174° C. (345° F.), 171° C. (340° F.), 168° C. (335° F.), 166° C. (330° F.), 163° C. (325° F.), 160° C. (320° F.), 157° C. (315° F.), 154° C. (310° F.), 152° C. (305° F.), and 149° C. (300° F.), encompassing any value and subset therebetween.

In some embodiments, the gelation retarder may be a carbonate salt of an alkali metal. Suitable gelation retarders for use in the sealant compositions (e.g., the crosslinkable polymer compositions) described herein may include, but are not limited to, sodium carbonate; sodium bicarbonate; lithium carbonate; lithium bicarbonate; potassium carbonate; potassium bicarbonate; ammonium carbonate; ammonium bicarbonate; and any combination thereof. The gelation retarder may be present in the sealant compositions in any amount sufficient to retard the crosslinking reaction between the crosslinkable organic polymer and the crosslinker to a desired degree. In some embodiments, the gelation retarder may be present in the sealant compositions in an amount in the range of a lower limit of about 0.1%, 0.25%, 0.5%, 0.75%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, and 5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, 5.5%, 5.25%, and 5% by volume of the crosslinkable polymer composition, encompassing any value and subset therebetween. In other embodiments, the gelation retarder may be present in the sealant compositions in an amount in the range of from about 0.5% to about 5% by volume of the crosslinkable polymer composition.

The sealant compositions described herein may comprise an elastic gellable composition. The elastic gellable compositions described herein are aqueous emulsions. As used herein, the term "aqueous emulsion" in all of its forms, refers to an emulsion having particles or microparticles of elastomeric polymers dispersed in a continuous aqueous phase (e.g., a latex emulsion). In some embodiments, the elastic gellable composition may be present in the sealant compositions of the present disclosure in an amount in the range of from a lower limit of about 35 Gal/Mgal ("Gal/Mgal" refers to gallons per 1,000 gallons) (equivalent to about 3.5%), 36 Gal/Mgal, 37 Gal/Mgal, 38 Gal/Mgal, 39 Gal/Mgal, 40 Gal/Mgal, 41 Gal/Mgal, 42 Gal/Mgal, 43 Gal/Mgal, 44 Gal/Mgal, and 45 Gal/Mgal to an upper limit of about 55 Gal/Mgal (equivalent to about 5.5%), 54 Gal/Mgal, 53 Gal/Mgal, 52 Gal/Mgal, 51 Gal/Mgal, 50 Gal/Mgal, 49 Gal/Mgal, 48 Gal/Mgal, 47 Gal/Mgal, 46 Gal/Mgal, and 45 Gal/Mgal by volume of the sealant composition, encompassing any value and subset therebetween.

The elastic gellable composition aqueous emulsions may have a foam quality in the range of from a lower limit of about 5%, 10%, 15%, 20%, 25%, 30%, 35%, and 40% to an upper limit of about 70%, 65%, 60%, 55%, 50%, 45%, and 40%, encompassing any value and subset therebetween. In some embodiments, the foam quality of the elastic gelled sealant composition is in the range of about 50% to about 95%. In some embodiments, the elastic gellable compositions may impart a foam quality to the sealant compositions in the same range. As used herein, the term "foam" refers to a two-phase composition having a continuous liquid or solid phase and a discontinuous gas phase. The foam quality must be such that the aqueous emulsion and the sealant composition in which it is included (or introduced) is a closed foam; that is, it does not have interconnected pores or holes that permit fluids to pass through. The foam quality may be determined by any method known by those of skill in the art, such as, in some embodiments, by determining the change in volume of the sealant composition upon addition of the elastic gellable composition, or by determining the specific gravity of the sealant composition before and after addition of the elastic gellable composition.

In some embodiments, an emulsion surfactant may be included in the elastic gellable composition to stabilize the aqueous emulsion by, for example, preventing or reducing the tendency of the elastomeric polymers from settling out of the aqueous emulsions and causing a breakdown of the integrity of the emulsion. Suitable emulsion surfactants may include, but are not limited to, a nonionic surfactant; a cationic surfactant; and any combination thereof. Non-limiting examples of suitable emulsion surfactants may include, but are not limited to an alkyl quaternary amine; an alkoxylated linear alcohol; an ether of alkylated phenol; an ethoxylated phenol; a substituted ethoxylated phenol; a sodium dodecylsulfate; a trimethyl hexadecyl ammonium bromide; any derivative thereof; or any combination thereof. Suitable examples of commercially available emulsion surfactants may include, but are not limited to, STABILIZER 434D™ and STABILIZATION 434B™, nonionic surfactants of a substituted ethoxylated phenol, available from Halliburton Energy Services, Inc. in Houston, Tex. In some embodiments, the emulsion surfactants may be included in the elastic gellable compositions in a range from a lower limit of about 10%, 12.5%, 15%%, 17.5%, 20%, 22.5%, 25%, 27.5%, and 30% to an upper limit of about 50%, 47.5%, 45%, 42.5%, 40%, 37.5%, 35%, 32.5%, and 30% by weight of the elastic gellable composition, encompassing any value and subset therebetween.

In some embodiments, the sealant composition may further comprise a gas so as to form dispersed bubbles within the sealant composition. The gas may aid in forming the aqueous emulsion and may aid in achieving a foam quality in the range of from a lower limit of about 5%, 10%, 15%, 20%, 25%, 30%, 35%, 40%, 45%, and 50% to an upper limit of about 95%, 90%, 85%, 80%, 75%, 70%, 65%, 60%, 55%, and 50%, encompassing any value and subset therebetween. In other embodiments, the foam quality of the aqueous emulsion may be between about 50% and about 70%. Suitable gases that may be used in the sealant compositions may include, but are not limited to nitrogen; carbon dioxide; air; methane; helium; argon; and any combination thereof. Such gases may be included in the sealant compositions to form the elastic gelled sealant compositions described herein by any method known to one of skill in the art, including agitation (e.g., blending) of the sealant composition so as to incorporate air; direct pumping of a gas into the sealant composition; inclusion of a material or substance that produces the gas; or any combination thereof. The foam quality (or dispersed gas bubbles) must be such that the aqueous emulsion and the sealant composition maintains a closed foam, as described above.

In those embodiments comprising a gas to further foam the sealant compositions, the sealant compositions may further comprise a gas surfactant. Suitable gas surfactants may include, but are not limited to, an amphoteric surfactant; a zwitterionic surfactant; an anionic surfactant; an amine oxide surfactant; and any combination thereof. Non-limiting examples of suitable gas surfactants may include, but are not limited to, a betaine; a cocoamine betaine; a cocamidopropyl betaine; a sulfobetaine; an alkyl amidopropyl betaine; an alkene amidopropyl betaine; a sulfated alkoxylate; a sulfonated alkoxylate; an alkyl sulfonate; an alkyl aryl sulfonate; a $C_{10}$-$C_{20}$ alkyldiphenyl ether sulfonate; an alpha olefin sulfonate (e.g., sodium dodecane sulfonate); an ethoxylated iso-dodecyl alcohol ether sulfate; an ethoxylated alcohol ether sulfate; any derivative thereof; or any combination thereof. Suitable examples of commercially available gas surfactants may include, but are not limited to HC-2™, a cocylamidopropyl betaine, and ZONESEAL 2000™, a blend of an anionic surfactant, a betaine, and an amine oxide, both available from Halliburton Energy Services, Inc. in Houston, Tex. In some embodiments, the gas surfactants may be included in sealant compositions in a range from a lower limit of about 10%, 12.5%, 15%%, 17.5%, 20%, 22.5%, 25%, 27.5%, and 30% to an upper limit of about 50%, 47.5%, 45%, 42.5%, 40%, 37.5%, 35%, 32.5%, and 30% by weight of the sealant composition, encompassing any value and subset therebetween.

In some embodiments, the sealant composition may further comprise a density segregation prevention agent. As used herein, the term "density segregation prevention agent," and grammatical variants thereof, refers to any substance capable of preventing or reducing settling or segregation of the individual constituents or phases within the sealant compositions described herein. In some embodiments, the density segregation prevention agent for use in the sealant compositions described herein may be capable of viscosifying the aqueous base fluid, stabilizing the foamed quality of the sealant composition (alone or with additional additives), and/or synergistically working with the elastic gellable composition to enhance gelation. In some embodiments, the density segregation prevention agent for use in the sealant compositions may be a biopolymer selected from the group consisting of a gum; a polysaccharide; and any combination thereof. Suitable biopolymers may include, but are not limited to, an alginic acid; a beta-glucan; a carrageenan; a welan gum; a chicle gum; a dammar gum; a gellan gum; a welan gum; a guar gum; a gum arabic; a gum ghatti; a gum tragachanth; a karava gum; a locust bean gum; a mastic gum; a psyllium seed husk; a sodium alginate; a spruce gum; a tara gum; a xanthan gum; a hydroxypropyl guar; a carboxymethyl hydroxypropyl guar; a diutan; a scleroglutan; a cellulose; a derivatized cellulose; a hydroxyethyl cellulose; a hydroxypropyl cellulose; a carboxymethyl cellulose; a carboxymethylhydroxyethyl cellulose; and any combination thereof. In some embodiments, the density segregation prevention agent for use in the sealant compositions described herein may be a natural or synthetic clay. Suitable examples of clays may include, but are not limited to, a smectite clay (e.g., montmorillonite, or bentonite); fuller's earth; saponite; natural hectorite; synthetic hectorite (e.g., laponite); and any combination thereof.

In some embodiments, the density segregation prevention agent may be present in the sealant compositions in an amount in the range of a lower limit of about 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, and 2.5% to an upper limit of about 5%, 4.9%, 4.8%, 4.7%, 4.6%, 4.5%, 4.4%, 4.3%, 4.2%, 4.1%, 4%, 3.9%, 3.8%, 3.7%, 3.6%, 3.5%, 3.4%, 3.3%, 3.2%, 3.1%, 3%, 2.9%, 2.8%, 2.7%, 2.6%, and 2.5% by weight of the sealant composition, encompassing any value and subset therebetween.

The elastic gellable compositions of the embodiments described herein may be an aqueous emulsion comprising a continuous aqueous phase and a dispersed phase comprising elastomeric polymers. The elastomeric polymers for use in the elastic gellable compositions may be any material or substance capable of deforming elastically under stress and returning to their original shape when the stress is removed and capable of forming an emulsion with the aqueous base fluid. In some embodiments, the elastomeric polymers may be water insoluble. Suitable examples of elastomeric polymers for use in the elastic gellable compositions described herein may include, but are not limited to, a natural rubber; a modified natural rubber; a synthetic rubber; and any combination thereof. As used herein, the term "rubber" refers to an elastic polymeric material. Specific suitable elastomeric polymers for use in the elastic gellable compositions described herein may include, but are not limited to, a cis-1,4-polyisoprene rubber; a trans-1,4-polyisoprene rubber; a synthetic polyisoprene rubber; a polybutadiene rubber; a chloroprene rubber; a polychloroprene rubber; an isobutylene/isoprene copolymer rubber; a styrene/butadiene copolymer rubber; a halogenated butyl rubber (e.g., chloro butyl rubber, bromo butyl rubber, and the like); a butadiene/acrylonitrile copolymer rubber; an ethylene/propylene copolymer rubber; an ethylene/vinyl acetate copolymer rubber; a nitrile/butadiene copolymer rubber; an acrylonitrile/butadiene/styrene terpolymer rubber; an acrylate/acrylonitrile/butadiene/styrene tetrapolymer rubber; a butadiene/isoprene copolymer rubber; a poly(isobutylene-co-styrene) polymer; a poly(isobutylene-co-alkyl styrene) rubber; a styrene/butadiene/acrylate terpolymer rubber; a styrene/butadiene/sulfonic acid copolymer; a styrene/butadiene/2-acrylamido-2-methylpropane sulfonic acid copolymer; any derivatives thereof; and any combination thereof. Any copolymers of these may also be suitable elastomeric polymers for use in the embodiments herein. Suitable commercially available elastic gellable compositions comprising elastomeric polymers may include, but are not limited to, LATEX 2000™, a styrene-butadiene rubber aqueous emulsion, and LATEX 3000™, a styrene/butadiene/sulfonic acid copolymer rubber aqueous emulsion, available from Halliburton Energy Services, Inc. in Houston, Tex.

In some embodiments, the elastomeric polymers may be present in the elastic gellable compositions described herein in an amount in the range of a lower limit of about 0.1%, 0.25%, 0.5%, 1.25%, 1.5%, 1.75%, 2%, 2.25%, 2.5%, 2.75%, 3%, 3.25%, 3.5%, 3.75%, 4%, 4.25%, 4.5%, 4.75%, and 5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, 5.5%, 5.25%, and 5% by volume of the elastic gellable composition, encompassing any value and subset therebetween.

In some embodiments, the sealant compositions described herein may further comprise a buffering agent. The buffering agent may act as a retarder to delay crosslinking of the sealant composition into a gel or to stabilize the pH of the sealant composition, which may be particularly beneficial at elevated temperatures. Suitable buffering agents may include, but are not limited to, sodium carbonate, potassium carbonate, sodium bicarbonate, and the like, and combinations thereof. Carbonate and bicarbonates may be suitable buffering agents; sodium carbonate is preferred. The buffering agent may be used in the range of a lower limit of about 200 pounds per 1,000 gallons ("lb/Mgal"), 225 lb/Mgal, 250 lb/Mgal, 275 lb/Mgal, 300 lb/Mgal, 325 lb/Mgal, and 350 lb/Mgal to an upper limit of about 600 lb/Mgal, 575 lb/Mgal, 550 lb/Mgal, 525 lb/Mgal, 500 lb/Mgal, 475 lb/Mgal, 450 lb/Mgal, 425 lb/Mgal, 400 lb/Mgal, 375 lb/Mgal, 350 lb/Mgal, encompassing any value and subset therebetween.

In various embodiments, systems configured for preparing, transporting, and delivering the elastic gelled sealant compositions described herein to a downhole location are described. In various embodiments, the systems can comprise a pump fluidly coupled to a tubular (e.g., a casing, drill pipe, production tubing, coiled tubing, etc.) extending into a wellbore penetrating a subterranean formation, the tubular may be configured to circulate or otherwise convey an elastic gelled sealant composition. The pump may be, for example, a high pressure pump or a low pressure pump, which may depend on, inter alia, the viscosity and density of the elastic gelled sealant composition, the type of the cementing operation, and the like.

In some embodiments, the systems described herein may further comprise a mixing tank arranged upstream of the pump and in which the elastic gelled sealant composition is formulated. In various embodiments, the pump (e.g., a low pressure pump, a high pressure pump, or a combination thereof) may convey the elastic gelled sealant composition from the mixing tank or other source of the elastic gelled sealant composition to the tubular. In other embodiments, however, the elastic gelled sealant composition can be formulated offsite and transported to a worksite, in which case the elastic gelled sealant composition may be introduced to the tubular via the pump directly from a transport vehicle or a shipping container (e.g., a truck, a railcar, a barge, or the like) or from a transport pipeline. In yet other embodiments, the elastic gelled sealant composition may be formulated on the fly at the well site where components of the elastic gelled sealant composition are pumped from a transport (e.g., a vehicle or pipeline) and mixed during introduction into the tubular. In any case, the elastic gelled sealant composition may be drawn into the pump, elevated to an appropriate pressure, and then introduced into the tubular for delivery downhole.

FIG. 1 shows an illustrative schematic of a system that can deliver elastic gelled sealant compositions of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which an elastic gelled sealant composition of the present disclosure may be formulated. Again, in some embodiments, the mixing tank 10 may represent or otherwise be replaced with a transport vehicle or shipping container configured to deliver or otherwise convey the elastic gelled sealant composition to the well site. The elastic gelled sealant composition may be conveyed via fline 12 to wellhead 14, where the elastic gelled sealant composition enters tubular 16 (e.g., a casing, drill pipe, production tubing, coiled tubing, etc.), tubular 16 extending from wellhead 14 into wellbore 22 penetrating subterranean formation 18. Upon being ejected from tubular 16, the elastic gelled sealant composition may subsequently return up the wellbore 22 in the annulus between the tubular 16 and the wellbore 22 as indicated by flow lines 24. In other embodiments, the elastic gelled sealant composition may be reverse pumped down through the annulus and up tubular 16 back to the surface, without departing from the scope of the disclosure. Pump 20 may be configured to raise the pressure of the elastic gelled sealant composition to a desired degree before its introduction into tubular 16 (or annulus). It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

One skilled in the art, with the benefit of this disclosure, should recognize the changes to the system described in FIG. 1 to provide for other subterranean formation operations.

It is also to be recognized that the disclosed elastic gelled sealant compositions may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments herein include:

Embodiment A: A method comprising: providing a sealant composition comprising an aqueous base fluid, a crosslinkable polymer composition, and an elastic gellable composition, wherein the crosslinkable polymer composition comprises a crosslinkable organic polymer and a crosslinker, and wherein the elastic gellable composition is an aqueous emulsion comprising an aqueous continuous phase and a dispersed phase comprising an elastomeric polymer; introducing the sealant composition into a subterranean formation; crosslinking the sealant composition into a gel to form an elastic gelled sealant composition; and forming a seal in at least a portion of the subterranean formation with the elastic gelled sealant composition.

Embodiment B: A method comprising: providing a sealant composition comprising an aqueous base fluid, a crosslinkable polymer composition, an elastic gellable composition, and an emulsion surfactant, wherein the crosslinkable polymer composition comprises a crosslinkable organic polymer and a crosslinker, and wherein the elastic gellable composition is an aqueous emulsion comprising an aqueous continuous phase and a dispersed phase comprising an elastomeric polymer; introducing the sealant composition into a subterranean formation; crosslinking the sealant composition into a gel to form an elastic gelled sealant composition; and forming a seal in at least a portion of the subterranean formation with the elastic gelled sealant composition.

Embodiment C: A composition comprising: a sealant composition comprising an aqueous base fluid, a crosslinkable polymer composition, and an elastic gellable composition, wherein the aqueous base fluid is present in a range of about 65% to about 99.5% by volume of the sealant composition, wherein the crosslinkable polymer composition is present in a range of about 0.1% to about 20% by volume of the sealant composition and comprises a crosslinkable organic polymer and a crosslinker, wherein the elastic gellable composition is present in a range of about 3.5% to about 5.5% by volume of the sealant composition and is an aqueous emulsion comprising an aqueous continuous phase and a dispersed phase comprising elastomeric polymers, and wherein the sealant composition is crosslinked to form an elastic gelled sealant composition.

Each of Embodiments A, B, and C may have one or more of the following elements in any combination:

Element 1: Wherein the sealant composition further comprises a gelation retarder.

Element 2: Wherein the sealant composition further comprises a gelation retarder comprising a carbonate salt of an alkali metal.

Element 3: Wherein the crosslinkable organic polymer is selected from the group consisting of an acrylamide-based polymer; any copolymer thereof; and any combination thereof.

Element 4: Wherein the crosslinkable organic polymer is selected from the group consisting of a polyacrylamide; an acrylamide copolymer; an acrylamide-co-t-butylacrylate copolymer; a 2-acrylamido-2-methylpropane sulfonic acid/acrylamide copolymer; a sulfonated styrene/maleic anhydride copolymer; a vinylpyrrolidone/2-acrylamido-2-methylpropane sulfonic acid/acrylamide terpolymer; a 2-acrylamido-2-methylpropane sulfonic acid/N—N-dimethylacrylamide/acrylamide terpolymer; a polyketone; an acrylamide/t-butyl acrylate copolymer; any derivative thereof; and any combination thereof.

Element 5: Wherein the crosslinker is selected from the group consisting of an amine-containing polymer; any copolymer thereof; and any combination thereof.

Element 6: Wherein the crosslinker is selected from the group consisting of a polyalkyleneimine; a polyalkylenepolyamine; a polyfunctional aliphatic amine; an arylalkylamine; a heteroarylalkylamine; a chitosan; a polylysine; a vinyl alcohol/vinylamine copolymer; a partially hydrolyzed polyvinyl formamide; any derivative thereof; and any combination thereof.

Element 7: Wherein the crosslinkable organic polymer and the crosslinker are water-soluble.

Element 8: Wherein the elastomeric polymer is selected from the group consisting of a natural rubber; a modified natural rubber; a synthetic rubber; and any combination thereof.

Element 9: Wherein the elastomeric polymer is selected from the group consisting of a cis-1,4-polyisoprene rubber; a trans-1,4-polyisoprene rubber; a synthetic polyisoprene rubber; a polybutadiene rubber; a chloroprene rubber; a polychloroprene rubber; an isobutylene/isoprene copolymer rubber; a styrene/butadiene copolymer rubber; a halogenated butyl rubber (e.g., chloro butyl rubber, bromo butyl rubber, and the like); a butadiene/acrylonitrile copolymer rubber; an ethylene/propylene copolymer rubber; an ethylene/vinyl acetate copolymer rubber; a nitrile/butadiene copolymer rubber; an acrylonitrile/butadiene/styrene terpolymer rubber; an acrylate/acrylonitrile/butadiene/styrene tetrapolymer rubber; a butadiene/isoprene copolymer rubber; a poly(isobutylene-co-styrene) polymer; a poly(isobutylene-co-alkyl styrene) rubber; a styrene/butadiene/acrylate terpolymer rubber; a styrene/butadiene/sulfonic acid copolymer; a styrene/butadiene/2-acrylamido-2-methylpropane sulfonic acid copolymer; any derivatives thereof; and any combination thereof.

Element 10: Wherein the sealant composition comprises an emulsion surfactant, the emulsion surfactant selected from the group consisting of a nonionic surfactant; a cationic surfactant; and any combination thereof.

By way of non-limiting example, exemplary combinations applicable to Embodiments A, B, and C include: 1 with 2; 1 with 3; 1 with 4; 1 with 5; 1 with 6; 1 with 7; 1 with 8; 1 with 9; 1 with 10; 2 with 3; 2 with 4; 2 with 5; 2 with 6; 2 with 7; 2 with 8; 2 with 9; 2 with 10; 3 with 4; 3 with 5; 3 with 6; 3 with 7; 3 with 8; 3 with 9; 3 with 10; 4 with 5; 4 with 6; 4 with 7; 4 with 8; 4 with 9; 4 with 10; 5 with 6; 5 with 7; 5 with 8; 5 with 9; 5 with 10; 6 with 7; 6 with 8; 6 with 9; 6 with 10; 7 with 8; 7 with 9; 7 with 10; 8 with 9; 8 with 10; 9 with 10; 1, 2, and 4; 3, 5, 8, and 10; 2, 4, and 9, 4, 6, and 8, 1, 5, and 10; 8, 9, and 10, 5, 7, and 8.

To facilitate a better understanding of the embodiments herein, the following examples are given. In no way should the following examples be read to limit, or to define, the scope of the disclosure, and they are illustrative only.

EXAMPLE 1

In this example, four sealant compositions according to one or more embodiments herein were prepared and evaluated for various parameters. Each of the four sealant compositions (SC1, SC2, SC3, and SC4) were prepared in accordance with Table 1 below. First, the aqueous base fluid (i.e., freshwater+2% KCl or seawater) was placed into a beaker having a mixer extended therein. To the aqueous base fluid, the elastic gellable composition comprising an emulsion surfactant (styrene/butadiene/sulfonic acid copolymer rubber aqueous emulsion, and a nonionic surfactant of a substituted ethoxylated phenol) was added and mixed at 700 rpm for 2 minutes ("min"). Thereafter, the polysaccharide density segregation prevention agent, welan gum, was added and mixed until the composition appeared homogeneous. The crosslinkable polymer composition was next included in a stepwise fashion, by first including the crosslinkable organic polymer (acrylamide-co-t-butylacrylate copolymer) and mixing for 2 min, followed by adding the crosslinker (polyethyleneimine) and mixing for an additional 2 min. In Table 1, the units are provided for each component of the sealant composition; the term "Gal/Mgal" refers to gallons per 1,000 gallons, and the term "Lb/Mgal" refers to pounds per 1,000 gallons.

TABLE 1

| Component | | SC1 | SC2 | SC3 | SC4 |
|---|---|---|---|---|---|
| Aqueous Base Fluid | Freshwater + 2% KCl (Gal/Mgal) | — | 540 | — | 546 |
| | Seawater (Gal/Mgal) | 540 | — | 546 | — |
| Elastic Gellable Composition | Elastic Gellable Composition (Gal/Mgal) | 50 | 50 | 30 | 30 |
| | Emulsion Surfactant (Gal/Mgal) | 10 | 10 | 7 | 7 |

TABLE 1-continued

| Component | | SC1 | SC2 | SC3 | SC4 |
|---|---|---|---|---|---|
| Crosslinkable Polymer Composition | Crosslinkable Organic Polymer (Gal/Mgal) | 350 | 350 | 350 | 350 |
| | Crosslinker (Gal/Mgal) | 90 | 90 | 90 | 90 |
| Density Segregation Prevention Agent (Lb/Mgal) | | 55 | 55 | 50 | 50 |

Each of SC1-SC4 were measured for viscosity using a FANN® 35A Viscometer at 25° C. and atmospheric pressure. The results are shown in Table 2 and demonstrate that the reduced amount of elastic gellable composition and emulsion surfactant resulted in a reduced viscosity overall of the sealant composition.

TABLE 2

| | SC1 | SC2 | SC3 | SC4 |
|---|---|---|---|---|
| Viscosity (cP) | 286 | 255 | 240 | 228 |

EXAMPLE 2

Each of SC1-SC4 were prepared according to Example 1, foamed, and tested for foam quality. From each of SC1, SC2, SC3, and SC4, 250 milliliters ("mL") was removed and 40 Gal/Mgal of a gas surfactant (cocamidopropyl betaine) was added to each. A volume measurement was taken. Then gas in the form of air was supplied to each of the sealant compositions by vigorous mixing at 12,000 rpm for 1 min. The foam quality was then determined by evaluating the volume of each of SC1-SC4 after foaming at room temperature (26° C.). Each of SC1-SC3 had a foam quality of 55% and SC4 has a foam quality of 56%, indicating good foam quality of each of the sealant compositions at room temperature. Moreover, the variable elastic gellable composition and emulsion surfactant had no appreciable effect on foam quality in the amounts listed in Table 1. After the elapse of 24 hours at room temperature, the sealant compositions were visually observed to maintain stability.

EXAMPLE 3

Each of SC1-SC4 were prepared according to Example 1. Each of the samples was measured for density ("Base Density") and thereafter 40 Gal/Mgal of a gas surfactant (cocamidopropyl betaine) was added and foamed by adding air by vigorous mixing for 1 min and the density measured ("Foam Density"). The density results are shown in Table 3 and demonstrate that the foamed sealant compositions exhibit reduced densities and, again, that the variable amounts of elastic gellable composition and emulsion surfactant listed in Table 1 had no appreciable effect on density. Density is represented as grams per cubic centimeter ("g/cm$^3$").

TABLE 3

| | SC1 | SC2 | SC3 | SC4 |
|---|---|---|---|---|
| Base Density (g/cm$^3$) | 0.96 | 0.95 | 0.95 | 0.95 |
| Foam Density (g/cm$^3$) | 0.45 | 0.46 | 0.45 | 0.44 |

EXAMPLE 4

Each of SC1-SC4 were prepared according to Example 1 and measured for viscosity, without foaming. A 250 mL sample of each of SC1-SC4 was tested for apparent viscosity using a FANN® 35A Viscometer (non-foamed) at a shear rate of 300 RMP for 1 min at 25° C. and atmospheric pressure. The results are shown in Table 4 and demonstrate that the reduced amount of elastic gellable composition and emulsion surfactant resulted in a reduced viscosity overall of the sealant composition.

TABLE 4

|  | SC1 | SC2 | SC3 | SC4 |
|---|---|---|---|---|
| Viscosity (cP) | 286 | 255 | 240 | 228 |

EXAMPLE 5

Each of SC1-SC4 were prepared according to Example 1, foamed, and measured for gelation time. A 250 mL sample of each SC1-SC4 was foamed using 40 Gal/Mgal of a gas surfactant (cocamidopropyl betaine) and vigorous mixing for 1 min to add air. Then, the gelation time was determined under one of two conditions—either in a 90° C. water bath or in a FANN® 50SL Rheometer at 100° C. and 400 psi of nitrogen. The foamed samples were considered "gelled" when the sample is greater than 2500 cP (this is true for the remaining examples, as well), at which point it is no longer flowing. The results (in Hours:Minutes) are shown in Table 5 and demonstrate that gelation at the elevated 100° C. temperature, as compared to 90° C., was considerably accelerated.

TABLE 5

| Gelation Time (Hrs:Min) | | | | |
|---|---|---|---|---|
|  | SC1 | SC2 | SC3 | SC4 |
| 100° C. | 2:20 | 2:00 | 2:07 | 2:03 |
| 90° C. | 3:20 | 3:15 | 3:12 | 3:18 |

EXAMPLE 6

Two test samples (SC5 and SC6) were prepared according to the method of Example 1, with the components (i.e., the same chemical compositions for each component) as Table 1, but in the proportions provided in Table 6. The symbol "--" means that the particular component was not included.

TABLE 6

|  | Component | SC5 | SC6 |
|---|---|---|---|
| Aqueous Base Fluid | Seawater (Gal/Mgal) | 546 | 546 |
| Elastic Gellable Composition | Elastic Gellable Composition (Gal/Mgal) | 50 | 50 |
|  | Emulsion Surfactant (Gal/Mgal) | 10 | 10 |
| Crosslinkable Polymer Composition | Crosslinkable Organic Polymer (Gal/Mgal) | — | 350 |
|  | Crosslinker (Gal/Mgal) | — | 90 |
| Density Segregation Prevention Agent (Lb/Mgal) | | 55 | 55 |
| Gas Surfactant (Cocamidopropyl betaine) (Gal/Mgal) | | 40 | 40 |

The viscosity, plastic viscosity, and yield point of each of SC5 and SC6 was tested without foaming (i.e., no gas (air) was added) using the FANN® 35A Viscometer at 25° C. and atmospheric pressure. Rheology testing was performed using standard Bob1 (1.7245 centimeter ("cm") radius×7.62 cm length) and standard Bob2 (1.2276 cm radius×7.620 cm length). The viscosity (cP) was tested at various RPM readings, e.g., $L_{300}$ refers to a viscosity reading at 300 RPM. The plastic viscosity (PV) (cP) and Yield Point (YP) (lb/100 ft$^2$) are also provided. The results are show in Table 7 and demonstrate that at high RPM and both Bobs, SC6 comprising the crosslinkable gel composition exhibited increased viscosity and plastic viscosity. The yield point increased for Bob1 and decreased slightly for Bob2. The results indicate that the crosslinkable polymer composition increases viscosity. It is not believed, since the samples were not foamed, that the gas surfactant significantly affected, if at all, the viscosity, plastic viscosity, and yield point.

TABLE 7

|  | SC5 | | SC6 | |
|---|---|---|---|---|
| Parameter | Bob1 Results | Bob2 Results | Bob1 Results | Bob2 Results |
| $L_3$ (cP) | 45 | 21 | 23 | 12.5 |
| $L_6$ (cP) | 52 | 26 | 40 | 17 |
| $L_{100}$ (cP) | 119.5 | 49 | 174 | 60.5 |
| $L_{200}$ (cP) | 152 | 59.5 | 233 | 87.5 |
| $L_{300}$ (cP) | 180 | 70 | 285 | 110 |
| PV (cP) | 90.75 | 31.5 | 166.5 | 74.5 |
| YP (lb/100 ft$^2$) | 89.25 | 38.5 | 118.5 | 35.25 |

EXAMPLE 7

Two test samples (SC7 and SC8) were prepared according to the method of Example 1, with the same components (i.e., the same chemical compositions for each component) in Table 1, but in the proportions provided in Table 8. The symbol "--" means that the particular component was not included.

TABLE 8

|  | Component | SC7 | SC8 |
|---|---|---|---|
| Aqueous Base Fluid | Freshwater + 2% KCl (Gal/Mgal) | 543 | 543 |
| Elastic Gellable Composition | Elastic Gellable Composition (Gal/Mgal) | 50 | 50 |
|  | Emulsion Surfactant (Gal/Mgal) | 10 | 10 |
| Crosslinkable Polymer Composition | Crosslinkable Organic Polymer (Gal/Mgal) | — | 350 |
|  | Crosslinker (Gal/Mgal) | — | 90 |
| Density Segregation Prevention Agent (Lb/Mgal) | | 55 | 55 |
| Gas Surfactant (Cocamidopropyl betaine) (Gal/Mgal) | | 40 | 40 |

The rheology of each of SC7 and SC8 was tested without foaming (i.e., no gas (air) was added) according to Example 6. The results are shown in Table 9 and demonstrate relatively similar viscosity readings as compared to Example 6 (without the 2% KCl). However, the plastic viscosity of SC7 (compared to SC5 of Example 6) dropped significantly for Bob1 and Bob2, and the plastic viscosity of SC8 (compared to SC6 of Example 6) also dropped significantly. These results indicate that viscosity is increased when the samples use seawater (as used in Table 6) compared to freshwater+ 2% KCl (as in Table 9).

TABLE 9

|  | SC7 | | SC8 | |
|---|---|---|---|---|
| Parameter | Bob1 Results | Bob2 Results | Bob1 Results | Bob2 Results |
| $L_3$ (cP) | 38.5 | 21.5 | 20 | 11 |
| $L_6$ (cP) | 47 | 24 | 37 | 14 |
| $L_{100}$ (cP) | 92.5 | 42.5 | 150 | 39.5 |
| $L_{200}$ (cP) | 111.15 | 49 | 220 | 55.5 |

TABLE 9-continued

| | SC7 | | SC8 | |
|---|---|---|---|---|
| Parameter | Bob1 Results | Bob2 Results | Bob1 Results | Bob2 Results |
| $L_{300}$ (cP) | 126 | 54 | 256 | 69 |
| PV (cP) | 50.25 | 17.25 | 159 | 44.25 |
| YP (lb/100 ft$^2$) | 75.75 | 36.75 | 97 | 24.75 |

EXAMPLE 8

Two test samples (SC9 and SC10) were prepared according to the method of Example 1, with the same components (i.e., the same chemical compositions for each component) as in Table 1, but in the proportions provided in Table 10. The symbol "--" means that the particular component was not included.

TABLE 10

| | Component | SC9 | SC10 |
|---|---|---|---|
| Aqueous Base Fluid | Seawater (Gal/Mgal) | 546 | 546 |
| Elastic Gellable Composition | Elastic Gellable Composition (Gal/Mgal) | 30 | 30 |
| | Emulsion Surfactant (Gal/Mgal) | 7 | 7 |
| Crosslinkable Polymer Composition | Crosslinkable Organic Polymer (Gal/Mgal) | — | 350 |
| | Crosslinker (Gal/Mgal) | — | 90 |
| Density Segregation Prevention Agent (Lb/Mgal) | | 50 | 50 |
| Gas Surfactant (Cocamidopropyl betaine) (Gal/Mgal) | | 40 | 40 |

The rheology of each of SC9 and SC10 was tested without foaming (i.e., no gas (air) was added) according to Example 6. The results are shown in Table 11 and demonstrate that the viscosity of SC10 is generally higher than the viscosity of SC9 due to the presence of the crosslinkable polymer composition. As compared to Example 6, SC6 shows higher viscosities than SC10, due to the increased amount of elastic gellable composition in SC6. Generally, with the exception of the plastic viscosity ready for Bob1 of SC10, the plastic viscosity and yield point of SC10 is higher than that of comparable SC6 from Example 6, the only difference in the two being the amount of elastic gellable composition. On the other hand, the plastic viscosity and yield point of SC9 is generally less than that of SC5, again with the only difference being the presence of the amount of elastic gellable composition. These results indicate that decreasing the amount of the elastic gellable composition decreases the viscosity.

TABLE 11

| | SC9 | | SC10 | |
|---|---|---|---|---|
| Parameter | Bob1 Results | Bob2 Results | Bob1 Results | Bob2 Results |
| $L_3$ (cP) | 37 | 18 | 22 | 7 |
| $L_6$ (cP) | 42 | 22 | 31.5 | 11 |
| $L_{100}$ (cP) | 77 | 35.5 | 125 | 41 |
| $L_{200}$ (cP) | 91.5 | 41.5 | 201 | 61 |
| $L_{300}$ (cP) | 105 | 45 | 240 | 78 |
| PV (cP) | 45 | 14.25 | 175.5 | 55.5 |
| YP (lb/100 ft$^2$) | 60 | 30.75 | 64.5 | 22.5 |

EXAMPLE 9

Two test samples (SC11 and SC12) were prepared according to the method of Example 1, with the same components (i.e., the same chemical compositions for each component) as in Table 1, but in the proportions provided in Table 12. The symbol "--" means that the particular component was not included.

TABLE 12

| | Component | SC11 | SC12 |
|---|---|---|---|
| Aqueous Base Fluid | Freshwater + 2% KCl (Gal/Mgal) | 546 | 546 |
| Elastic Gellable Composition | Elastic Gellable Composition (Gal/Mgal) | 30 | 30 |
| | Emulsion Surfactant (Gal/Mgal) | 7 | 7 |
| Crosslinkable Polymer Composition | Crosslinkable Organic Polymer (Gal/Mgal) | — | 350 |
| | Crosslinker (Gal/Mgal) | — | 90 |
| Density Segregation Prevention Agent (Lb/Mgal) | | 55 | 55 |
| Gas Surfactant (Cocamidopropyl betaine) (Gal/Mgal) | | 40 | 40 |

The rheology of each of SC11 and SC12 was tested without foaming (i.e., no gas (air) was added) according to Example 6. The results are show in Table 13 and demonstrate relatively similar apparent readings as compared to Example 8 (without the 2% KCl). The results are also generally similar to Example 7 (increased elastic gellable composition), with some increase in viscosity. However, the plastic viscosity of SC12, as compared to SC8, dropped fairly dramatically, the only difference being the amount of elastic gellable composition. These results again indicate that viscosity is generally greater when seawater is used as compared to freshwater+2% KCl.

TABLE 13

| | SC10 | | SC11 | |
|---|---|---|---|---|
| Parameter | Bob1 Results | Bob2 Results | Bob1 Results | Bob2 Results |
| $L_3$ (cP) | 37 | 20 | 22 | 8.5 |
| $L_6$ (cP) | 42 | 22 | 27 | 10 |
| $L_{100}$ (cP) | 79.5 | 40.5 | 117 | 32.5 |
| $L_{200}$ (cP) | 98 | 45.5 | 183 | 47.5 |
| $L_{300}$ (cP) | 111 | 51 | 230 | 60 |
| PV (cP) | 47.25 | 15.75 | 169 | 41.25 |
| YP (lb/100 ft$^2$) | 63.75 | 35.25 | 60.5 | 18.75 |

EXAMPLE 10

In this example, a sealant composition (SC12) according to one or more embodiments herein was prepared and evaluated for various parameters. SC12 was prepared in accordance with Table 14 below. First, the aqueous base fluid was placed into a beaker having a mixer extended therein. To the aqueous base fluid, the elastic gellable composition comprising an emulsion surfactant (a styrene-butadiene rubber aqueous emulsion, and a nonionic surfactant of a substituted ethoxylated phenol) was added and mixed at 700 rpm for 2 minutes ("min"). Thereafter, the polysaccharide density segregation prevention agent, welan gum, was added and mixed until the composition appeared homogeneous. The crosslinkable polymer composition was next included in a stepwise fashion, by first including the crosslinkable organic polymer (acrylamide-co-t-butylacrylate copolymer) and mixing for 2 min, followed by adding the crosslinker (polyethyleneimine) and mixing for an additional 2 min.

TABLE 14

| | Component | SC12 |
|---|---|---|
| Aqueous Base Fluid | Fresh Water + 2% KCl (Gal/Mgal) | 554 |
| Elastic Gellable Composition | Elastic Gellable Composition (Gal/Mgal) | 30 |
| | Emulsion Surfactant (Gal/Mgal) | 9 |
| Crosslinkable Polymer Composition | Crosslinkable Organic Polymer (Gal/Mgal) | 300 |
| | Crosslinker (Gal/Mgal) | 80 |
| Density Segregation Prevention Agent (Lb/Mgal) | | 50 |

From SC12, 250 mL was removed and 40 Gal/Mgal of a gas surfactant (cocamidopropyl betaine) added. A volume measurement was taken and a density measurement ("Base Density"). Then gas in the form of air was supplied to the sealant composition by vigorous mixing at 12,000 rpm for at least 1 min, until a foam quality between 50% to 70% at room temperature was achieved. The density of the foamed SC12 was also measured ("Foam Density"). The Base Density and Foam Density are presented in Table 15 and show that the foamed sealant composition has a reduced density compared to the base density.

TABLE 15

| | SC12 |
|---|---|
| Base Density (g/cm$^3$) | 0.96 |
| Foam Density (g/cm$^3$) | 0.40 |

EXAMPLE 11

SC12 was prepared according to Example 10 and measured for viscosity, without foaming. A 250 mL sample of SC12 was tested for apparent viscosity using a FANN® 35A Viscometer (non-foamed) at a shear rate of 300 RMP for 1 min at 25° C. and atmospheric pressure. The results are shown in Table 16. The compositions shown in Table 1 each have greater amounts of the crosslinkable polymer composition and each exhibit greater viscosity than SC12, as expected.

TABLE 16

| | SC12 |
|---|---|
| Viscosity (cP) | 155 |

EXAMPLE 12

SC12 was prepared according to Example 10, foamed, and tested for foam quality. From SC12, 250 milliliters ("mL") was removed and 40 Gal/Mgal of a gas surfactant (cocamidopropyl betaine) was added. A volume measurement was taken. Then gas in the form of air was supplied to each of the sealant compositions by vigorous mixing at 12,000 rpm for 1 min. The foam quality was then determined by evaluating the volume of SC12 after foaming at room temperature (26° C.). SC12 had a foam quality of 60%, indicating good foam quality of the sealant compositions at room temperature. After the elapse of 24 hours at room temperature, the sealant composition was visually observed to maintain stability.

EXAMPLE 19

SC12 was prepared according to Example 10, foamed, and measured for gelation time. A 250 mL sample of SC12 was foamed using 40 Gal/Mgal of a gas surfactant (cocamidopropyl betaine) and vigorous mixing for 1 min to add air. Then, the gelation time was determined under one of two conditions—either in a 90° C. water bath or in a FANN® 50SL Rheometer at 100° C. and 400 psi of nitrogen. The results (in Hours: Minutes) are shown in Table 17 and demonstrate that gelation at the elevated 100° C. temperature, as compared to 90° C., was considerably accelerated. Additionally, the gelation time results are very similar to those shown in Table 5, indicating that the slight variability in the amount of crosslinkable polymer composition and/or elastic gellable composition did not have a large effect on gelation time.

TABLE 17

| Gelation Time (Hrs:Min) | |
|---|---|
| | SC12 |
| 100° C. | 2:19 |
| 90° C. | 3:35 |

EXAMPLE 20

A test sample (SC13) was prepared according to the method of Example 10, with the same components (i.e., the same chemical compositions for each component) as in Table 10, but in the proportions provided in Table 18. The symbol "--" means that the particular component was not included.

TABLE 18

| | Component | SC13 |
|---|---|---|
| Aqueous Base Fluid | Freshwater + 2% KCl (Gal/Mgal) | 554 |
| Elastic Gellable Composition | Elastic Gellable Composition (Gal/Mgal) | 30 |
| | Emulsion Surfactant (Gal/Mgal) | 9 |
| Crosslinkable Polymer Composition | Crosslinkable Organic Polymer (Gal/Mgal) | 300 |
| | Crosslinker (Gal/Mgal) | 80 |
| Density Segregation Prevention Agent (Lb/Mgal) | | 55 |
| Gas Surfactant (cocamidopropyl betaine) (Gal/Mgal) | | 40 |

The rheology of SC13 was tested without foaming (i.e., no gas (air) was added) using the FANN® 35A Viscometer at 25° C. and atmospheric pressure. Rheology testing was performed using standard Bob1 (1.7245 centimeter ("cm") radius×7.62 cm length) and standard Bob2 (1.2276 cm radius×7.620 cm length). The viscosity (cP) was tested at various RPM readings, e.g., $L_{300}$ refers to an reading at 300 RPM. The plastic viscosity (PV) (cP) and Yield Point (YP) (lb/100 ft$^2$) are also provided. The results are shown in Table 19 and demonstrate that at high RPM and both Bobs, SC13 exhibited increased viscosity and plastic viscosity, although the results between both Bobs are generally comparable. The apparent viscosity (AV) was also determined at 300 RPR for 1 min and is provided in Table 19.

TABLE 19

| Parameter | SC13 | |
| --- | --- | --- |
| | Bob1 Results | Bob2 Results |
| $L_3$ (cP) | 22 | 24 |
| $L_6$ (cP) | 29 | 31 |
| $L_{100}$ (CP) | 90 | 93 |
| $L_{200}$ (cP) | 125 | 127 |
| $L_{300}$ (cP) | 154 | 160 |
| PV (cP) | 96 | 100.5 |
| YP (lb/100 ft$^2$) | 58 | 59.5 |
| AV (cP) | 155 | 162 |

EXAMPLE 21

In this example, a sealant composition (SC14) according to one or more embodiments herein was prepared and evaluated for foam stability, system pressure, and permeability reduction after passing through porous media. SC14 was prepared in accordance with Table 20 below. First, the aqueous base fluid was placed into a blender. To the aqueous base fluid, an elastic gellable composition was added in a stepwise fashion, but first including an emulsion surfactant (nonionic surfactant of a substituted ethoxylated phenol) into the blender at 700 rpm for 2 min, followed by the elastic gellable composition (a styrene-butadiene rubber aqueous emulsion) into the blender at 700 rpm for 2 min. Thereafter, the polysaccharide density segregation prevention agent, welan gum, was added and mixed until the composition appeared homogeneous (about 1 hour), while avoiding air entrainment into the composition. The crosslinkable polymer composition was next included in a stepwise fashion, the crosslinkable polymer composition comprising a crosslinkable organic polymer (acrylamide-co-t-butylacrylate copolymer) and a crosslinker (polyethyleneimine), and mixing continued until the composition appeared homogeneous. Next, the composition was foamed using a gas surfactant (cocamidopropyl betaine) and mixing at 8,500 rpm to add air until a desired foam quality of about 55% (i.e., volume of composition after foaming) was reached.

TABLE 20

| | Component | SC14 |
| --- | --- | --- |
| Aqueous Base Fluid | Freshwater + 2% KCl (Gal/Mgal) | 554 |
| Elastic Gellable Composition | Elastic Gellable Composition (Gal/Mgal) | 30 |
| | Emulsion Surfactant (Gal/Mgal) | 9 |
| Crosslinkable Polymer Composition | Crosslinkable Organic Polymer (Gal/Mgal) | 300 |
| | Crosslinker (Gal/Mgal) | 80 |
| Density Segregation Prevention Agent (Lb/Mgal) | | 50 |
| Gas Surfactant (cocamidopropyl betaine) (Gal/Mgal) | | 40 |

Core flow testing for percent permeability reduction was performed using the foamed SC14 composition. A core was prepared with a 6 inch ("in") sandpack tube comprising BARACARB® 1200, a ground marble with a median particle size (d50) of about 1200, available from Halliburton Energy Services, Inc. in Houston, Tex. Brine (2% KCl) was first pumped through the core to check for leaks. Thereafter, the core was heated to a test temperature of 105° C. (221° F.) to simulate reservoir temperature. Brine was again run through the core at 10 mL/min and the permeability determined. Thereafter, SC14 was run through the core at 10 mL/min until there is no evident dilution of SC14 from the brine. Thereafter, the foam quality was determined based on specific gravity at 1 pore volume and 10 pore volumes. Thereafter, the core was shut in for about 24 hours at the test temperature. After the shut in period, brine was again pumped into the core and the permeability measured and compared to the original brine permeability for calculating percent permeability reduction. The results are shown in Table 21.

TABLE 21

| Test No. | Initial Perm (mD) | Final Perm (mD) | % Perm Reduction | Pore Volumes Treated | Foam Specific Gravity Before Injection | Foam Specific Gravity After Injection |
| --- | --- | --- | --- | --- | --- | --- |
| SC14 | 76424 | 13.3367 | 99.9 | 10 | 0.45 | 0.63 |

The results indicate an increase in specific gravity after having gone through the core, from 0.45 to 0.63, representing a decrease in foam quality from about 55% to about 37%. The decrease in permeability was 99.9%, indicating that the sealant composition provided excellent conformance control. This permeability reduction was achieved after only about 2 hours.

The foamed samples of SC14 were also collected after passing through the core and placed into an oven at 107° C. (224.6° F.) at 1 pore volume and 10 pore volumes. The samples were visually inspected and confirmed that at 10 pore volumes, crosslinking had occurred as no separation in the foam was visible.

EXAMPLE 22

In this example, four sealant compositions were prepared according to one or more embodiments herein without the elastic gellable composition and evaluated for various parameters. Each of the four sealant compositions (SC15, SC16, SC17, and SC18) were prepared in accordance with Table 22 below. First, the aqueous base fluid was placed into a beaker having a mixer extended therein. To the aqueous base fluid, the polysaccharide density segregation prevention agent, welan gum, was added and mixed until the composition appeared homogeneous. The crosslinkable polymer composition was next included where shown in Table 22 in a stepwise fashion, by first including the crosslinkable organic polymer (acrylamide-co-t-butylacrylate copolymer) and mixing for 2 min, followed by adding the crosslinker (polyethyleneimine) and mixing for an additional 2 min. A gas surfactant (either a cocamidopropyl betaine, or a blend of an anionic surfactant, a betaine, and an amine oxide) was added, where included as shown in Table 22), followed by vigorous mixing for 1 minute to entrain air and form foamed sealant compositions.

TABLE 22

| | Component | SC15 | SC16 | SC17 | SC18 |
| --- | --- | --- | --- | --- | --- |
| Aqueous Base Fluid | SeaWater + 2% KCl (Gal/Mgal) | 554 | 554 | 559 | 554 |
| Crosslinkable Polymer Composition | Crosslinkable Organic Polymer (Gal/Mgal) | 350 | 350 | 350 | 350 |
| | Crosslinker (Gal/Mgal) | 80 | 80 | 75 | 80 |
| Density Segregation Prevention Agent (Lb/Mgal) | | 55 | 45 | 40 | 45 |

TABLE 22-continued

| | Component | SC15 | SC16 | SC17 | SC18 |
|---|---|---|---|---|---|
| Gas Surfactant | Cocamidopropyl betaine (Gal/Mgal) | 30 | 40 | 40 | — |
| | Blend of Anionic Surfactant, Betaine, and Amine Oxide (Gal/Mgal) | — | — | — | 30 |

The foam quality was determined for each of SC15-SC18 by evaluating the volume of each before and after foaming at room temperature (26° C.). The foam quality is provided in Table 23 and demonstrates that the variability in the amount and/or type of the various components of SC15-SC18 did not appreciably influence foam quality. After the elapse of 24 hours at room temperature, the sealant compositions were visually observed to maintain stability.

TABLE 23

| | SC15 | SC16 | SC17 | SC18 |
|---|---|---|---|---|
| Foam Quality | 55 | 62 | 58 | 60 |

EXAMPLE 23

Each of SC15-SC18 were prepared according to Example 22 and measured for density. Each of the samples was measured for density before addition of the gas surfactant and foaming ("Base Density") and after addition of the gas surfactant and foaming ("Foam Density"). The density results are shown in Table 24 and demonstrate that the foamed sealant compositions exhibit reduced densities and, again, that the variable amounts of the various components of each of SC15-SC18 in Table 22 had no appreciable effect on density. However, the base density, as compared to the compositions in Table 3 above for example, that comprise the elastic gelled composition, were slightly elevated. The results indicate that the differences in the compositions SC15-SC18 did not result in significant changes in base density and foam density.

TABLE 24

| | SC15 | SC16 | SC17 | SC18 |
|---|---|---|---|---|
| Base Density (g/cm$^3$) | 1.013 | 1.015 | 1.013 | 1.017 |
| Foam Density (g/cm$^3$) | 0.45 | 0.38 | 0.42 | 0.40 |

EXAMPLE 24

Each of SC15-SC18 were prepared according to Example 1, foamed, and measured for gelation time. The gelation time was determined under one of two conditions—either in a 90° C. water bath or in a FANN® 50SL Rheometer at 100° C. and 400 psi of nitrogen. The results (in Hours: Minutes) are shown in Table 25 and demonstrate that gelation at the elevated 100° C. temperature, as compared to 90° C., was considerably accelerated.

TABLE 25

| | Gelation Time (Hrs:Min) | | | |
|---|---|---|---|---|
| | SC15 | SC16 | SC17 | SC18 |
| 100° C. | 2:17 | 2:05 | 1:56 | 1:58 |
| 90° C. | 3:18 | 3:01 | 2:57 | 3:06 |

EXAMPLE 25

SC15-SC18 were prepared according to the method of Example 22. The rheology of each of SC15-SC18 was tested without foaming (i.e., no gas (air) was added) using the FANN® 35A Viscometer 25° C. and atmospheric pressure. Rheology testing was performed using standard Bob1 (1.7245 centimeter ("cm") radius×7.62 cm length). The viscosity (cP) was tested at various RPM readings, e.g., $L_{300}$ refers to an viscosity reading at 300 RPM. The plastic viscosity (PV) (cP), Yield Point (YP) (lb/100 ft$^2$), and apparent viscosity (AV) (cP) (at 300 RPM for 1 min) are also provided. The decreased amount of crosslinker (and perhaps the decreased amount of density segregation agent) in SC17 resulted in decreased viscosity, plastic viscosity, yield point, and apparent viscosity compared to SC15, SC16, and SC18.

TABLE 26

| Parameter | SC15 | SC16 | SC17 | SC18 |
|---|---|---|---|---|
| $L_3$ (cP) | 18 | 14 | 8.5 | 15 |
| $L_6$ (cP) | 23 | 19 | 12 | 17.5 |
| $L_{100}$ (cP) | 93 | 83 | 67.5 | 82 |
| $L_{200}$ (cP) | 143 | 129 | 107.5 | 130 |
| $L_{300}$ (cP) | 187 | 169 | 143 | 171 |
| PV (cP) | 141 | 129 | 113.25 | 133.5 |
| YP (lb/100 ft$^2$) | 46 | 40 | 29.75 | 37.5 |
| AV (cP) | 188 | 167 | 142 | 170 |

EXAMPLE 26

In this example, fourteen sealant compositions (SC19-SC32) were prepared with inclusion of an elastic gelled composition (LATEX 2000™) in accordance with Table 27 below and tested for density and foam quality. The aqueous base fluid ("ABF") is either freshwater+2% KCL ("FW+2%") or seawater ("SW"), the emulsion surfactant is STABILIZER 434D™, the density segregation prevention agent ("DSPA") is a welan gum, the crosslinkable polymer composition ("CPC") comprises an acrylamide-co-t-butylacrylate copolymer crosslinkable organic polymer ("COP") and a polyethyleneimine crosslinker ("X-linker"), and the gas surfactant ("GS") is a cocamidopropyl betaine.

TABLE 27

| | FW + 2% (Gal/Mgal) | SW (Gal/Mgal) | STABILIZER 434D ™ (Gal/Mgal) | LATEX 2000 ™ (Gal/Mgal) | DSPA (Lb/Mgal) | COP (Gal/Mgal) | X-linker (Gal/Mgal) | GS (Gal/Mgal) |
|---|---|---|---|---|---|---|---|---|
| SC19 | 484 | — | 9 | 30 | 50 | 300 | 200 | 20 |
| SC20 | 644 | — | 9 | 30 | 50 | 300 | 40 | 20 |

TABLE 27-continued

|      | FW + 2% (Gal/Mgal) | SW (Gal/Mgal) | STABILIZER 434D ™ (Gal/Mgal) | LATEX 2000 ™ (Gal/Mgal) | DSPA (Lb/Mgal) | COP (Gal/Mgal) | X-linker (Gal/Mgal) | GS (Gal/Mgal) |
|------|------|------|------|------|------|------|------|------|
| SC21 | —   | 543 | 10 | 50 | 55 | 350 | 90  | 40 |
| SC22 | 543 | —   | 10 | 50 | 55 | 350 | 90  | 40 |
| SC23 | —   | 546 | 7  | 30 | 50 | 350 | 90  | 40 |
| SC24 | 546 | —   | 7  | 30 | 50 | 350 | 90  | 40 |
| SC25 | 594 | —   | 9  | 30 | 50 | 300 | 90  | 40 |
| SC26 | 584 | —   | 9  | 30 | 50 | 300 | 100 | 40 |
| SC27 | 564 | —   | 9  | 30 | 50 | 300 | 120 | 40 |
| SC28 | 544 | —   | 9  | 30 | 50 | 300 | 140 | 40 |
| SC29 | 634 | —   | 9  | 30 | 50 | 300 | 50  | 40 |
| SC30 | 614 | —   | 9  | 30 | 50 | 300 | 70  | 40 |
| SC31 | 594 | —   | 9  | 30 | 50 | 300 | 90  | 40 |
| SC32 | 584 | —   | 9  | 30 | 50 | 300 | 100 | 40 |

Each of SC19-SC32 was measured for density before ("Base Density") and after foaming ("Foam Density") by adding air by vigorous mixing for 1 min before adding the gas surfactant. The density results are shown in Table 28 and demonstrate once again that the foamed sealant compositions exhibit reduced densities.

TABLE 28

|      | Base Density (g/cm$^3$) | Foam Density (g/cm$^3$) |
|------|------|------|
| SC19 | 0.96 | 0.40 |
| SC20 | 0.96 | 0.40 |
| SC21 | 0.96 | 0.45 |
| SC22 | 0.97 | 0.45 |
| SC23 | 0.97 | 0.45 |
| SC24 | 0.95 | 0.44 |
| SC25 | 0.96 | 0.40 |
| SC26 | 0.97 | 0.42 |
| SC27 | 0.97 | 0.42 |
| SC28 | 0.95 | 0.41 |
| SC29 | 0.95 | 0.43 |
| SC30 | 0.97 | 0.40 |
| SC31 | 0.96 | 0.40 |
| SC32 | 0.97 | 0.42 |

The foam quality after foaming was also determined by comparing the volume of each composition before and after foaming. The results are shown in Table 29 and each composition has a foam quality between 55% and 60%.

TABLE 29

|      | Foam Quality |
|------|------|
| SC19 | 60% |
| SC20 | 60% |
| SC21 | 55% |
| SC22 | 55% |
| SC23 | 55% |
| SC24 | 56% |
| SC25 | 60% |
| SC26 | 58% |
| SC27 | 58% |
| SC28 | 59% |
| SC29 | 57% |
| SC30 | 60% |
| SC31 | 60% |
| SC32 | 58% |

EXAMPLE 27

In this example, SC19-SC32 were prepared as provided in Example 26 and thereafter, to each was added 3% of an elastic gellable composition of either a styrene-butadiene rubber aqueous emulsion ("S-B Emulsion") or a styrene/butadiene/sulfonic acid copolymer rubber aqueous emulsion ("S-B-SA Emulsion"). Thereafter, each was tested at a specific temperature for time to reach a representative bottomhole static temperature ("BHST") shown in Table 30, gelation time (as defined previously as the time to reach 2500 cP) was determined using a water bath for SC19 at the stated temperature and a FANN® 50SL Rheometer at the stated temperature and 400 psi of nitrogen, and apparent viscosity was determined using a FANN® 35A Viscometer at 25° C., a shear stress of 300, and at atmospheric pressure. The results are shown in Table 30 below. The results show that at increased temperatures, the time to gelation is generally reduced, regardless of the type of elastic gellable composition, as is evidence from the reduced crosslinker used in SC29 and the increased gelation time.

TABLE 30

| No. | S-B Emulsion (Gal/Mgal) | S-B-SA Emulsion (Gal/Mgal) | Temp (° C.) | Time to BHST (min) | Time to Gelation (Hrs:min) | Apparent Viscosity (cP) |
|------|------|------|------|------|------|------|
| SC19 | 40 | —  | 60    | 15 | 06:30 | 138 |
| SC20 | 40 | —  | 98.9  | 30 | 04:55 | 205 |
| SC21 | —  | 40 | 100   | 40 | 01:40 | 166 |
| SC22 | —  | 40 | 100   | 40 | 01:20 | 160 |
| SC23 | —  | 40 | 100   | 40 | 01:27 | 175 |
| SC24 | —  | 40 | 100   | 40 | 01:23 | 170 |
| SC25 | 30 | —  | 107.2 | 30 | 01:00 | 144 |
| SC26 | 30 | —  | 107.2 | 30 | 00:50 | 147 |
| SC27 | 30 | —  | 107.2 | 30 | 00:40 | 150 |
| SC28 | 30 | —  | 107.2 | 30 | 00:30 | 152 |
| SC29 | 30 | —  | 121.1 | 30 | 01:15 | 140 |
| SC30 | 30 | —  | 121.1 | 30 | 00:40 | 142 |
| SC31 | 30 | —  | 121.1 | 30 | 00:30 | 144 |
| SC32 | 30 | —  | 121.1 | 30 | 00:25 | 147 |

Therefore, the embodiments herein are well adapted to attain the ends and advantages mentioned as well as those that are inherent therein. The particular embodiments disclosed above are illustrative only and may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a sealant composition comprising an aqueous base fluid, a crosslinkable polymer composition, and an elastic gellable composition,
wherein the crosslinkable polymer composition comprises a crosslinkable organic polymer and a crosslinker,
wherein the elastic gellable composition is an aqueous emulsion comprising an aqueous continuous phase and a dispersed phase comprising an elastomeric polymer;
wherein the aqueous base fluid is present in a range of about 65% to about 99.5% by volume of the sealant composition, the crosslinkable polymer composition is present in a range of about 0.1% to about 20% by volume of the sealant composition, and the elastomeric polymer in the elastic gellable composition is present in a range of about 0.1% to about 10% by volume of the elastic gellable composition;
introducing the sealant composition into a subterranean formation; crosslinking the sealant composition into a gel to form an elastic gelled sealant composition; and
forming a seal in at least a portion of the subterranean formation with the elastic gelled sealant composition,
wherein a gelation time to form the elastic gelled sealant composition is reduced with the elastic gellable composition compared to a sealant composition without the elastic gellable composition at 100° C.,
wherein a base density of the sealant composition is reduced with the elastic gellable composition compared to a sealant composition without the elastic gellable composition,
wherein a foam density of the sealant composition is reduced with the elastic gellable composition compared to a sealant composition without the elastic gellable composition, and
wherein a viscosity of the sealant composition is reduced with the elastic gellable composition compared to a sealant composition without the elastic gellable composition.

2. The method of claim 1, wherein the sealant composition further comprises a gelation retarder.

3. The method of claim 2, wherein the gelation retarder comprises a carbonate salt of an alkali metal.

4. The method of claim 1, wherein the crosslinkable organic polymer is selected from the group consisting of an acrylamide-based polymer; any copolymer thereof; and any combination thereof.

5. The method of claim 1, wherein the crosslinkable organic polymer is selected from the group consisting of a polyacrylamide; an acrylamide copolymer; an acrylamide-co-t-butylacrylate copolymer; a 2-acrylamido-2-methylpropane sulfonic acid/acrylamide copolymer;
a sulfonated styrene/maleic anhydride copolymer; a vinylpyrrolidone/2-acrylamido-2-methylpropane sulfonic acid/acrylamide terpolymer; a 2-acrylamido-2-methylpropane sulfonic acid/N-N-dimethylacrylamide/acrylamide terpolymer; a polyketone; an acrylamide/t-butyl acrylate copolymer; any derivative thereof; and any combination thereof.

6. The method of claim 1, wherein the crosslinker is selected from the group consisting of an amine-containing polymer; any copolymer thereof; and any combination thereof.

7. The method of claim 1, wherein the crosslinker is selected from the group consisting of a polyalkyleneimine; a polyalkylenepolyamine; a polyfunctional aliphatic amine; an arylalkylamine; a heteroarylalkylamine; a chitosan; a polylysine; a vinyl alcohol/vinylamine copolymer; a partially hydrolyzed polyvinyl formamide; any derivative thereof; and any combination thereof.

8. The method of claim 1, wherein the crosslinkable organic polymer and the crosslinker are water-soluble.

9. The method of claim 1, wherein the elastomeric polymer is selected from the group consisting of a natural rubber; a modified natural rubber; a synthetic rubber; and any combination thereof.

10. The method of claim 1, wherein the elastomeric polymer is selected from the group consisting of a cis-1,4-polyisoprene rubber; a trans-1,4-polyisoprene rubber; a synthetic polyisoprene rubber; a polybutadiene rubber; a chloroprene rubber; a polychloroprene rubber; an isobutylene/isoprene copolymer rubber; a styrene/butadiene copolymer rubber; a halogenated butyl rubber selected from the group consisting of chloro butyl rubber, bromo butyl rubber; a butadiene/acrylonitrile copolymer rubber; an ethylene/propylene copolymer rubber; an ethylene/vinyl acetate copolymer rubber; a nitrile/butadiene copolymer rubber; an acrylonitrile/butadiene/styrene terpolymer rubber; an
acrylate/acrylonitrile/butadiene/styrene tetrapolymer rubber; a butadiene/isoprene copolymer rubber; a poly(isobutylene-co-styrene) polymer; a poly(isobutylene-co-alkyl styrene) rubber; a styrene/butadiene/acrylate terpolymer rubber; a styrene/butadiene/sulfonic acid copolymer; a styrene/butadiene/2-acrylamido-2-methylpropane sulfonic acid copolymer; any derivatives thereof; and any combination thereof.

11. A method comprising:
providing a sealant composition comprising an aqueous base fluid, a crosslinkable polymer composition, an elastic gellable composition, and an emulsion surfactant,
wherein the crosslinkable polymer composition comprises a crosslinkable organic polymer and a crosslinker,
wherein the elastic gellable composition is an aqueous emulsion comprising an aqueous continuous phase and a dispersed phase comprising an elastomeric polymer;
wherein the aqueous base fluid is present in a range of about 65% to about 99.5% by volume of the sealant composition, the crosslinkable polymer composition is present in a range of about 0.1% to about 20% by volume of the sealant composition, and the elastomeric polymer in the elastic sellable composition is present in a range of about 0.1% to about 10% by volume of the elastic sellable composition;

introducing the sealant composition into a subterranean formation;

crosslinking the sealant composition into a gel to form an elastic gelled sealant composition; and forming a seal in at least a portion of the subterranean formation with the elastic gelled sealant composition;

wherein a gelation time to form the elastic gelled. sealant composition is reduced with the elastic sellable composition compared to a sealant composition without the elastic gellable composition at 100° C., wherein a base density of the sealant composition is reduced with the elastic gellable composition compared to a sealant composition without the elastic gellable composition, wherein a foam density of the sealant composition is reduced with the elastic gellable composition compared to a sealant composition without the elastic gellable composition, and wherein a viscosity of the sealant composition is reduced with the elastic sellable composition compared to a sealant composition without the elastic gellable composition.

12. The method of claim 11, wherein the sealant composition further comprises a gelation retarder.

13. The method of claim 12, wherein the gelation retarder comprises a carbonate salt of an alkali metal.

14. The method of claim 11, wherein the crosslinkable organic polymer is selected from the group consisting of an acrylamide-based polymer; any copolymer thereof; and any combination thereof.

15. The method of claim 11, wherein the crosslinker is selected from the group consisting of an amine-containing polymer; any copolymer thereof; and any combination thereof.

16. The method of claim 11, wherein the crosslinkable organic polymer and the crosslinker are water-soluble.

17. The method of claim 11, wherein the emulsion surfactant is selected from the group consisting of a nonionic surfactant; a cationic surfactant; and any combination thereof.

18. The method of claim 11, wherein the elastomeric polymer is selected from the group consisting of a natural rubber; a modified natural rubber; a synthetic rubber; and any combination thereof.

19. The method of claim 11, wherein the elastomeric polymer is selected from the group consisting of a cis-1,4-polyisoprene rubber; a trans-1,4-polyisoprene rubber; a synthetic polyisoprene rubber; a polybutadiene rubber; a chloroprene rubber; a polychloroprene rubber; an isobutylene/isoprene copolymer rubber; a styrene/butadiene copolymer rubber; a halogenated butyl rubber selected from the group consisting of chloro butyl rubber, bromo butyl rubber; a butadiene/acrylonitrile copolymer rubber; an ethylene/propylene copolymer rubber; an ethylene/vinyl acetate copolymer rubber; a nitrile/butadiene copolymer rubber; an acrylonitrile/butadiene/styrene terpolymer rubber; an
  acrylate/acrylonitrile/butadiene/styrene tetrapolymer rubber; a butadiene/isoprene copolymer rubber; a poly(isobutylene-co-styrene) polymer; a poly(isobutylene-co-alkyl styrene) rubber; a styrene/butadiene/acrylate terpolymer rubber; a styrene/butadiene/sulfonic acid copolymer; a styrene/butadiene/2-acrylamido-2-methylpropane sulfonic acid copolymer; any derivatives thereof; and any combination thereof.

* * * * *